United States Patent [19]

Kommula et al.

(10) Patent No.: US 8,798,059 B1
(45) Date of Patent: Aug. 5, 2014

(54) OPTIMIZING PRIVATE VIRTUAL LOCAL AREA NETWORKS (VLANS)

(75) Inventors: Sunanda Kommula, Cupertino, CA (US); Rudramahesh Rugge, Sunnyvale, CA (US); Pranay Pogde, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 682 days.

(21) Appl. No.: 12/959,676

(22) Filed: Dec. 3, 2010

(51) Int. Cl.
*H04L 12/28* (2006.01)
*H04L 12/56* (2006.01)

(52) U.S. Cl.
USPC ............ 370/392; 370/389; 370/395.53

(58) Field of Classification Search
None
See application file for complete search history.

(56) References Cited

U.S. PATENT DOCUMENTS

| 2005/0175022 A1* | 8/2005 | Nishimura et al. ......... 370/401 |
| 2006/0146835 A1* | 7/2006 | Homchaudhuri et al. ......... 370/395.53 |
| 2009/0154470 A1* | 6/2009 | Kuc ......... 370/395.53 |

* cited by examiner

*Primary Examiner* — Hassan Phillips
*Assistant Examiner* — Lonnie Sweet
(74) *Attorney, Agent, or Firm* — Harrity & Harrity, LLP

(57) ABSTRACT

A network device is provided in a private virtual local area network (VLAN). The network device receives a packet on one of multiple private VLAN ports of the network device, and assigns a classified VLAN signature to the packet. The network device also assigns a primary VLAN signature to the packet, and stores a media access control (MAC) address and the classified VLAN signature of the packet in a single MAC address table.

20 Claims, 8 Drawing Sheets

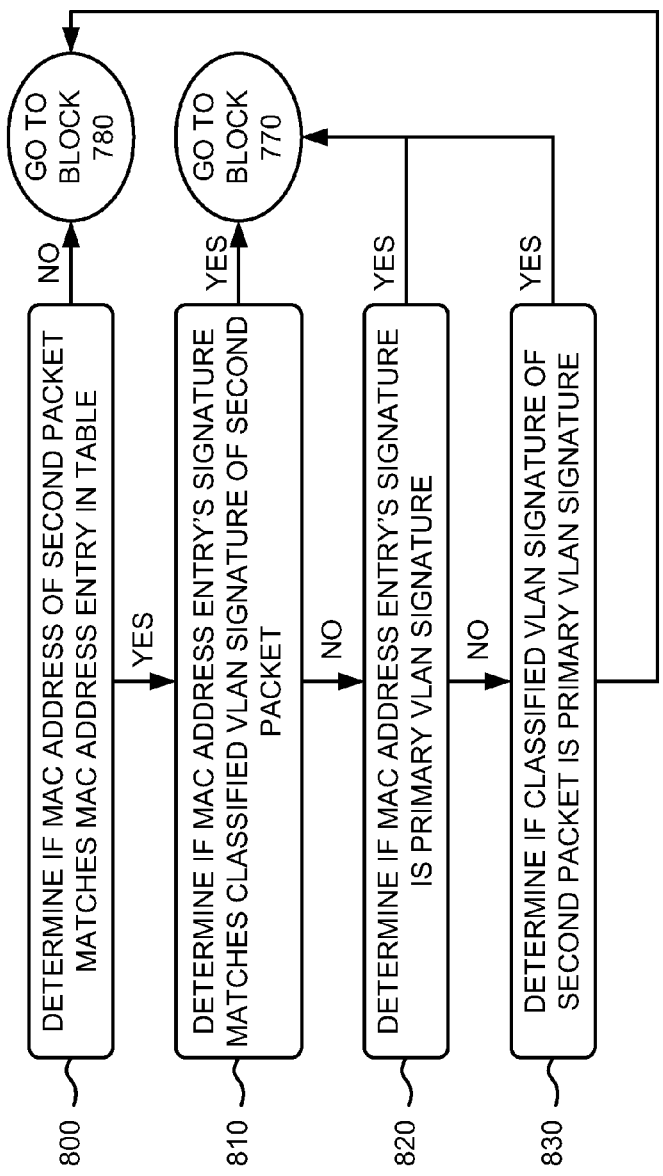

OPTIMIZING PRIVATE VIRTUAL LOCAL AREA NETWORKS (VLANS)

BACKGROUND

A private virtual local area network (VLAN) is a Layer 2 (i.e., a data link layer of the seven-layer Open Systems Interconnection (OSI) model) security feature that allows segregation of host devices within a VLAN. A private VLAN includes a primary VLAN and one or more secondary VLANs provided within the primary VLAN. There are two types of secondary VLANs: a secondary community VLAN and a secondary isolated VLAN. Ports within a community VLAN can communicate with each other but cannot communicate with ports in other community VLANs at the Layer 2 level. Ports within an isolated VLAN cannot communicate with each other at the Layer 2 level. Private VLANs provide Layer 2 isolation between ports within the same private VLAN. The private VLAN ports may be promiscuous ports, community ports, or isolated ports.

A promiscuous port belongs to the primary VLAN and can communicate with all interfaces, including community and isolated ports that belong to the secondary VLANs associated with the primary VLAN. A community port is a host port that belongs to a secondary community VLAN. Community ports communicate with other ports in the same community VLAN and with promiscuous ports. Community ports are isolated from all other interfaces in other communities and from isolated ports within their private VLAN. An isolated port is a host port that belongs to a secondary isolated VLAN. Isolated ports have complete Layer 2 separation from other ports within the same private VLAN, except for promiscuous ports. Private VLANs block all traffic to isolated ports except traffic from promiscuous ports. Traffic received from an isolated port may be forwarded only to promiscuous ports.

In order to implement these communication guidelines, multiple broadcast domains are created and Ethernet media access control (MAC) addresses are installed in VLANs. For example, a MAC address learned on an isolated port is installed in the isolated VLAN and in the primary VLAN. A MAC address learned on a community port is installed in the community VLAN and in the primary VLAN. A MAC address learned on a promiscuous port is installed in the primary VLAN, in all community VLANs, and in all isolated VLANs. Thus, MAC address learning is needed in more than one VLAN. In an application-specific integrated circuit (ASIC)-based forwarding system, hardware learning is disabled, and MAC address learning is achieved with software learning. In software learning, a central processing unit (CPU) receives an indication of a new MAC address and decides whether to install the new MAC address in an unbounded number of VLAN MAC address tables. However, maintaining multiple VLAN MAC address tables puts a strain on hardware resources (e.g., the CPU).

SUMMARY

According to one aspect, a method may be implemented by a network device provided in a private virtual local area network (VLAN). The method may include receiving, by the network device, a first packet on one of a plurality of private VLAN ports of the network device, and assigning, by the network device, a classified VLAN signature to the first packet. The method may also include assigning, by the network device, a primary VLAN signature to the first packet, and storing, by the network device, a media access control (MAC) address and the classified VLAN signature of the first packet in a single MAC address table.

According to another aspect, a network device may be provided in a private virtual local area network (VLAN), and may include a memory to store a plurality of instructions and a processor to execute instructions in the memory. The processor may execute instructions in the memory to receive a first packet on one of a plurality of private VLAN ports of the network device, assign a classified VLAN signature to the first packet, and assign a primary VLAN signature to the first packet. The process may also execute instructions in the memory to store a media access control (MAC) address and the classified VLAN signature of the first packet in a single MAC address table, where the MAC address of the first packet includes a destination MAC address of the first packet, and the classified VLAN signature is associated with a classified VLAN of the one of the plurality of private VLAN ports.

According to still another aspect, one or more non-transitory computer-readable media may store instructions executable by one or more processors provide in a network device of a private virtual local area network (VLAN). The media may store one or more instructions for receiving a first packet on one of a plurality of private VLAN ports of the network device, assigning a classified VLAN signature to the first packet, assigning a primary VLAN signature to the first packet, and storing a media access control (MAC) address and the classified VLAN signature of the first packet in a single MAC address table. The media may also store one or more instructions for receiving a second packet on another one of the plurality of VLAN ports, assigning a classified VLAN signature to the second packet, assigning a primary VLAN signature to the second packet, comparing the second packet to the MAC address table, and using a destination MAC address, determined from the comparison, to forward the second packet.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 7 and 8 are flow charts of an example process for optimizing private VLANs according to implementations described herein.

DETAILED DESCRIPTION

The following detailed description refers to the accompanying drawings. The same reference numbers in different drawings may identify the same or similar elements.

Systems and/or methods described herein may implement private VLANs with hardware learning and without CPU intervention. For example, the systems and/or methods may classify packets received by private VLAN ports based on the types of ports (e.g., promiscuous, community, or isolated) receiving the packets. The systems and/or methods may also apply MAC address learning to all private VLAN ports, and may store the learned MAC addresses in a single primary VLAN MAC address table (e.g., rather than in multiple tables). The systems and/or methods may also utilize a destination MAC lookup (e.g., of the primary VLAN MAC address table) to determine whether to forward a packet to a located MAC address or to treat the packet as unknown unicast traffic.

In an example implementation, the systems and/or methods may receive a first packet on a private VLAN port of a network device, and may assign a classified VLAN signature and a primary VLAN signature to the first packet. The systems and/or methods may store a MAC address and the classified VLAN signature of the first packet in a single MAC address table, and may receive a second packet on the private VLAN port. The systems and/or methods may assign a classified VLAN signature and a primary VLAN signature to the second packet, and may compare the second packet to the MAC address table. The systems and/or methods may use a destination MAC address, determined from the comparison, for forwarding the second packet. Alternatively, the systems and/or methods may flood the second packet, as unknown unicast traffic, to the second packet's classified VLAN based on the comparison.

The term "component," as used herein, is intended to be broadly construed to include hardware (e.g., a processor, a microprocessor, an ASIC, a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
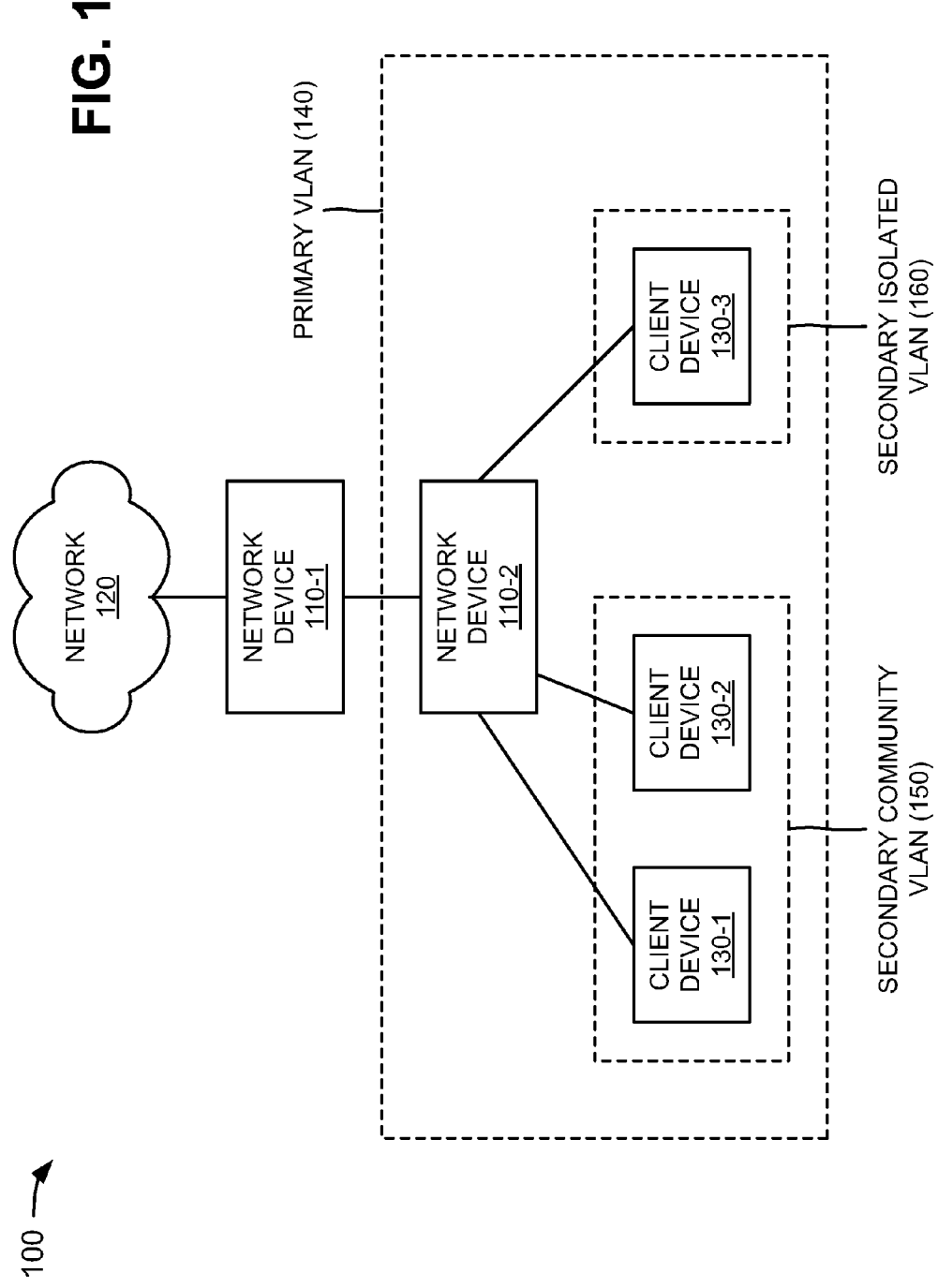
FIG. 1 is a diagram of an example network in which systems and/or methods described herein may be implemented.

FIG. 1 is a diagram of an example network 100 in which systems and/or methods described herein may be implemented. As illustrated, network 100 may include network devices 110-1 and 110-2 (collectively referred to herein as "network devices 110," and singularly as "network device 110"), a network 120, multiple client devices 130-1 through 130-3 (collectively referred to herein as "client devices 130," and singularly as "client device 130"), a primary VLAN 140, a secondary community VLAN 150, and a secondary isolated VLAN 160. In one example implementation, network 100 may form a private VLAN that includes primary VLAN 140, secondary community VLAN 150 and secondary isolated VLAN 160. Network device 110-2 and client devices 130-1 through 130-3 may be provided in primary VLAN 140. Client devices 130-1 and 130-2 may be provided in secondary community VLAN 150, and client device 130-3 may be provided in secondary isolated VLAN 160.

Components of network 100 may interconnect via wired and/or wireless connections or links. Two network devices 110, one network 120, three client devices 130, one primary VLAN 140, one secondary community VLAN 150, and one secondary isolated VLAN 160 have been illustrated in FIG. 1 for simplicity. In practice, there may be more network devices 110, networks 120, client devices 130, primary VLANs 140, secondary community VLANs 150, and/or secondary isolated VLANs 160. Also, in some instances, one or more of the components of network 100 may perform one or more tasks described as being performed by another one or more of the components of network 100.

Network device 110 may include a traffic transfer device, such as a gateway, a router, a switch, a firewall, a network interface card (NIC), a hub, a bridge, a proxy server, an optical add-drop multiplexer (OADM), or some other type of device that processes and/or transfers traffic. In an example implementation, network device 110 may include a device that is capable of transmitting information to and/or receiving information from network 120 and client devices 130.

Network 120 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks.

Client device 130 may include any device that is capable of accessing network 120 via network devices 110-1 and 110-2. For example, client device 130 may include a server device, a workstation computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a smart phone, a laptop computer, a personal computer, or other types of computation or communication devices.

Primary VLAN 140 may include network device 110-2 and all of client devices 130. Primary VLAN 140 may include all ports (e.g., promiscuous, community, and isolated ports) in the private VLAN (e.g., network 100). Primary VLAN 140 may define a flooding domain for broadcast, unknown unicast, and multicast (BUM) traffic received on the promiscuous ports. In a typical arrangement, a packet received on a promiscuous port may be classified to be associated with primary VLAN 140, and a MAC address learned on a promiscuous port may be installed in multiple MAC address tables associated with primary VLAN 140, secondary community VLAN 150, and secondary isolated VLAN 160. Implementations described herein may modify the classification of a packet received on a promiscuous port and may use a single MAC address table (e.g., as opposed to multiple MAC address tables).

Secondary community VLAN 150 may include client devices 130-1 and 130-2. Secondary community VLAN 150 may include the promiscuous ports and the community ports in the private VLAN (e.g., network 100). Secondary community VLAN 150 may define a flooding domain for BUM traffic received on the community ports. In a typical arrangement, a packet received on a community port may be classified to be associated with secondary community VLAN 150, and a MAC address learned on a community port may be installed in multiple MAC address tables associated with primary VLAN 140 and secondary community VLAN 150. Implementations described herein may modify the classification of a packet received on a community port and may use a single MAC address table (e.g., as opposed to multiple MAC address tables).

Secondary isolated VLAN 160 may include client device 130-3. Secondary isolated VLAN 160 may include the promiscuous ports and the isolated ports in the private VLAN (e.g., network 100), and may define a flooding domain for BUM traffic received on the isolated ports. A single isolated VLAN 160 may be sufficient to serve all isolated ports in the private VLAN. In a typical arrangement, a packet received on an isolated port may be classified to be associated with secondary isolated VLAN 160, and a MAC address learned on an isolated port may be installed in multiple MAC address tables associated with primary VLAN 140 and isolated community VLAN 160. Implementations described herein may modify the classification of a packet received on an isolated port and may use a single MAC address table (e.g., as opposed to multiple MAC address tables).

Although FIG. 1 shows example components of network 100, in other implementations, network 100 may include fewer components, different components, differently arranged components, or additional components than depicted in FIG. 1.

Figure 2:
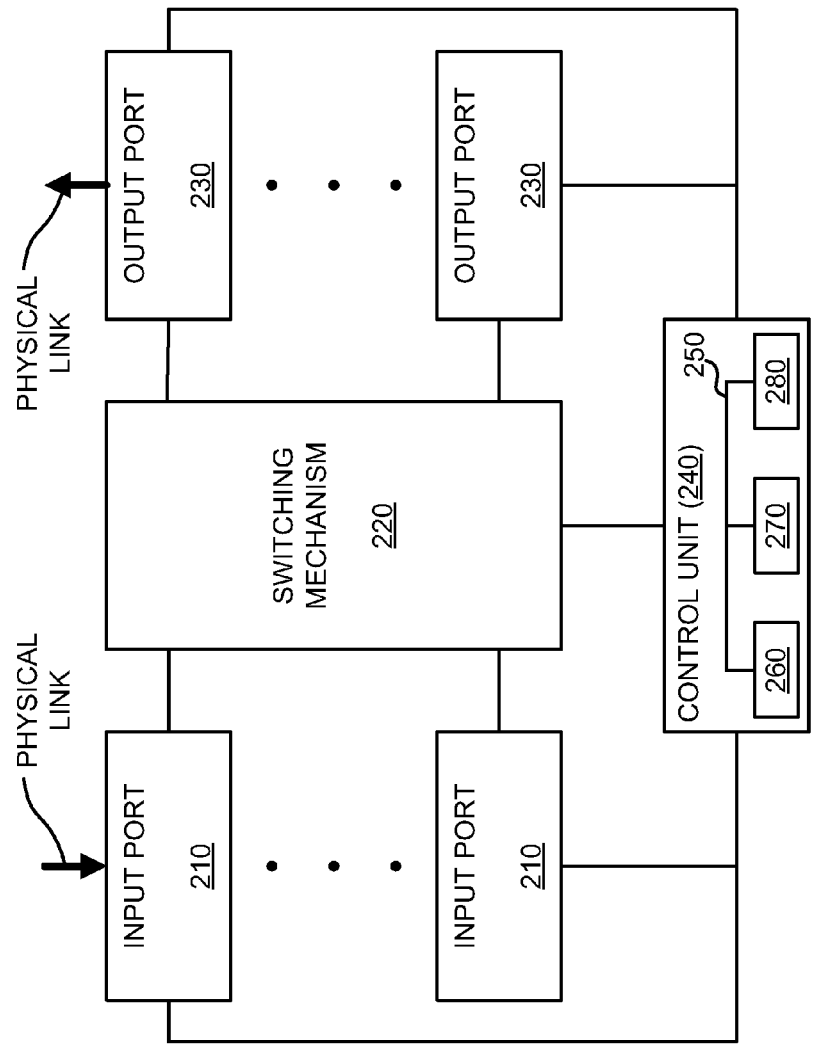
FIG. 2 is a diagram of example components of a network device depicted in FIG. 1.

FIG. 2 is a diagram of example components of a device 200 that may correspond to one of network devices 110-1 and 110-2 (FIG. 1). As shown, device 200 may include input ports 210, a switching mechanism 220, output ports 230, and a control unit 240.

Input ports 210 may be a point of attachment for physical links and may be a point of entry for incoming traffic (e.g., packets). Input ports 210 may carry out data link layer encapsulation and decapsulation. In example implementations, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or with shared memories (e.g., which may act as temporary buffers to store traffic from input ports 210 before the traffic is eventually scheduled for delivery to output ports 230).

Output ports 230 may store packets and may schedule packets for service on output links (e.g., physical links). Output ports 230 may include scheduling algorithms that support priorities and guarantees. Output ports 230 may support data link layer encapsulation and decapsulation, and/or a variety of higher-level protocols. In example implementations, output ports 230 may send packets (e.g., may be an exit point) and/or receive packets (e.g., may be an entry point).

Control unit 240 may use routing protocols and one or more forwarding tables for forwarding packets. Control unit 240 may connect with input ports 210, switching mechanism 220, and output ports 230. Control unit 240 may compute a forwarding table, implement routing protocols, and/or run software to configure and manage device 200. Control unit 240 may handle any packet whose destination address may not be found in the forwarding table.

In an example implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Memory 270 may also temporarily store incoming traffic (e.g., a header of a packet or an entire packet) from input ports 210, for processing by processor 260, before a packet is directed back to the shared memories (e.g., in switching mechanism 220), queued in the shared memories (e.g., based on processing results), and eventually scheduled to be sent to output ports 230. Communication interface 280 may include any transceiver-like mechanism that enables control unit 240 to communicate with other devices and/or systems.

Device 200 may perform certain operations, as described herein. Device 200 may perform these operations in response to processor 260 executing software instructions contained in a computer-readable medium, such as memory 270. A computer-readable medium may be defined as a non-transitory memory device. A memory device may include space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
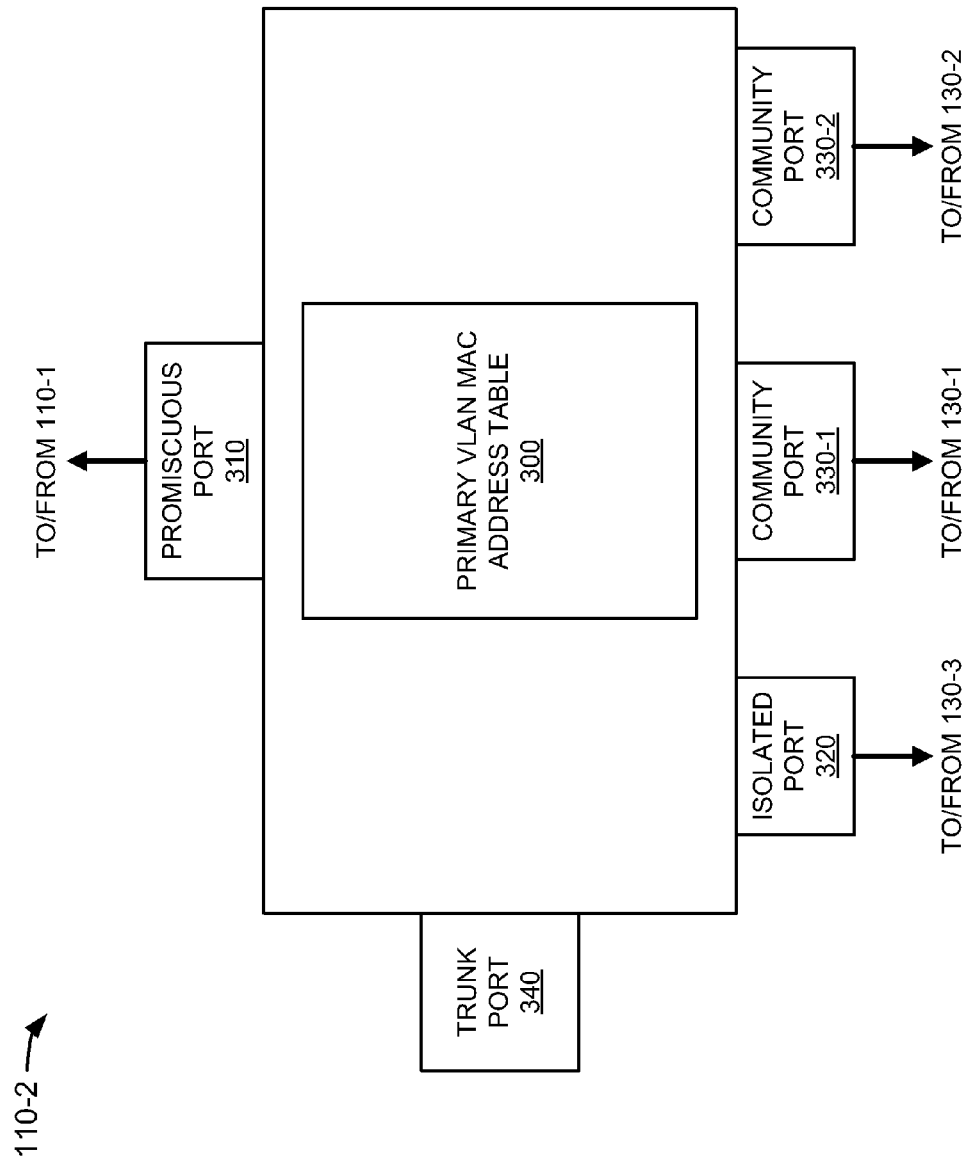
FIG. 3 is a diagram of further example components of the network device illustrated in FIG. 2.

FIG. 3 is a diagram of further example components of one of network devices 110 (e.g., network device 110-2). As shown, network device 110-2 may include a primary VLAN MAC address table 300, a promiscuous port 310, an isolated port 320, community ports 330-1 and 330-2 (collectively referred to herein as "community ports 330," and singularly as "community port 330"), and a trunk port 340.

Primary VLAN MAC address table 300 may include a single forwarding table that enables network device 110-2 to perform destination MAC address lookup for a packet (e.g., so that network device 110-2 can forward the packet to the appropriate device in network 100). For example, primary VLAN MAC address table 300 may include every MAC address learned on any of the private VLAN ports (e.g., promiscuous port 310, isolated port 320, community ports 330, and/or trunk port 340). Each MAC address provided in primary VLAN MAC address table 300 may also be associated with a signature that matches the MAC address' (e.g., a packet's) classified VLAN. In one example implementation, a packet may be classified to be associated with primary VLAN 140 (e.g., if the packet is received on promiscuous port 310), secondary community VLAN 150 (e.g., if the packet is received on one of community ports 330), and secondary isolated VLAN 160 (e.g., if the packet is received on isolated port 320). Further details of primary VLAN MAC address table 300 are provided below in connection with, for example, FIGS. 4-6.

Promiscuous port 310 may include one of input ports 210 or output ports 230 (FIG. 2) and may belong to primary VLAN 140. Promiscuous port 310 may communicate with all interfaces, including the community and isolated host ports that belong to secondary VLANs (e.g., secondary community VLAN 150 and secondary isolated VLAN 160) associated with primary VLAN 140. For example, promiscuous port 310 may communicate with the host ports that belong to the secondary VLANs via isolated port 320 and/or community ports 330. As further shown in FIG. 3, promiscuous port 310 may communicate with network device 110-1 and may send or receive traffic to/from network device 110-1.

Isolated port 320 may include one of input ports 210 or output ports 230 (FIG. 2) and may be a host port that belongs to secondary isolated VLAN 160. Isolated port 320 may have complete Layer 2 separation from other ports within the private VLAN (e.g., network 100), except for promiscuous port 310. Network device 110-2 may block all traffic to isolated port 320 except traffic received from promiscuous port 310. Network device 110-2 may forward traffic, received from isolated port 320, only to promiscuous port 310. As further shown in FIG. 3, isolated port 320 may communicate with client device 130-3 and may send or receive traffic to/from client device 130-3.

Community port 330 may include one of input ports 210 or output ports 230 (FIG. 2) and may be a host port that belongs to secondary community VLAN 150. Community ports 330 may communicate with other ports in the same community VLAN (e.g., secondary community VLAN 150) and with promiscuous port 310. Community ports 330 may be isolated at Layer 2 from all other interfaces in other communities and from isolated ports (e.g., isolated port 320) within the private VLAN (e.g., network 100). As further shown in FIG. 3, community port 330-1 may communicate with client device 130-1 and may send or receive traffic to/from client device 130-1. Community port 330-2 may communicate with client device 130-2 and may send or receive traffic to/from client device 130-2.

Trunk port 340 may include one of input ports 210 or output ports 230 (FIG. 2). Trunk port 340 may carry traffic from regular VLANs and also from primary VLAN 140, secondary community VLAN 150, and secondary isolated VLAN 160. For example, trunk port 340 may carry traffic from primary VLAN 140, secondary community VLAN 150, and secondary isolated VLAN 160 to a neighboring network device 110 (e.g., of another VLAN or private VLAN).

Although FIG. 3 shows example components of network device 110-2, in other implementations, network device 110-2 may include fewer components, different components, differently arranged components, or additional components than depicted in FIG. 3. For example, network device 110-2 may include more promiscuous ports 310, isolated ports 320, community ports 330, and/or trunk ports 340. Alternatively, or additionally, one or more components of network device 110-2 may perform one or more other tasks described as being performed by one or more other components of network device 110-2.

Figure 4:
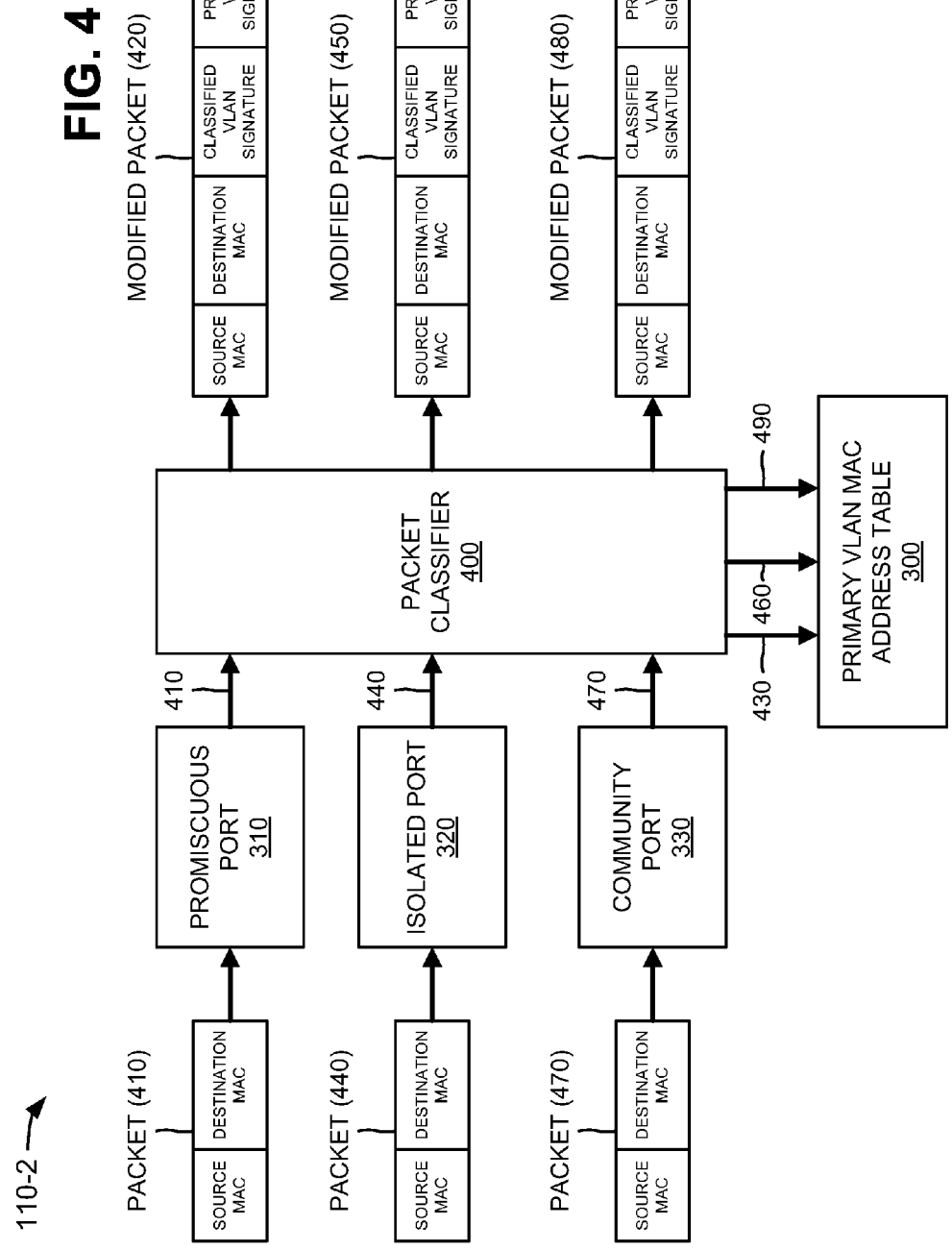
FIG. 4 is a diagram of example functional components of the network device depicted in FIG. 2.

FIG. 4 is a diagram of example functional components of network device 110-2. In one implementation, the functions described in connection with FIG. 4 may be performed by one or more components of device 200 (FIG. 2). As illustrated in FIG. 4, network device 110-2 may include primary VLAN MAC address table 300, promiscuous port 310, isolated port 320, community port 330, and a packet classifier 400. Primary VLAN MAC address table 300, promiscuous port 310, isolated port 320, and community port 330 may include the features described above in connection with, for example, FIG. 3.

Packet classifier 400 may include hardware or a combination of hardware and software that may receive a packet (e.g., from one of promiscuous port 310, isolated port 320, or community port 330). Packet classifier 400 may assign the packet with a classified VLAN signature associated with the port's classified VLAN, and may assign the packet with a primary VLAN signature associated with primary VLAN 140. For example, if the packet is received on promiscuous port 310, the port's classified VLAN would be primary VLAN 140, and packet classifier 400 may assign the packet with a classified VLAN signature associated with primary VLAN 140. In another example, if the packet is received on isolated port 320, the port's classified VLAN would be secondary isolated VLAN 160, and packet classifier 400 may assign the packet with a classified VLAN signature associated with secondary isolated VLAN 160. For MAC addresses (e.g., provided in packets received by network device 110-2) learned on promiscuous port 310, isolated port 320, or community port 330, packet classifier 400 may populate primary VLAN MAC address table 300 with the MAC addresses and with signatures equal to the packets' classified VLAN signatures.

For example, and as further shown in FIG. 4, promiscuous port 310 may receive a packet 410 (e.g., that includes a source MAC address and a destination MAC address), and may provide packet 410 to packet classifier 400. Packet classifier 400 may receive packet 410, and may assign packet 410 with a classified VLAN signature associated with promiscuous port's 310 classified VLAN (e.g., primary VLAN 140). Packet classifier 400 may also assign packet 410 with a primary VLAN signature associated with primary VLAN 140. Thus, packet 410 may be converted to a modified packet 420 that includes the source MAC address, the destination MAC address, the classified VLAN signature, and the primary VLAN signature. Packet classifier 400 may populate primary VLAN MAC address table 300 with the source MAC address of modified packet 420 and with the classified VLAN signature of modified packet 420, as indicated by reference number 430.

In another example, isolated port 320 may receive a packet 440 (e.g., that includes a source MAC address and a destination MAC address), and may provide packet 440 to packet classifier 400. Packet classifier 400 may receive packet 440, and may assign packet 440 with a classified VLAN signature associated with isolated port's 320 classified VLAN (e.g., secondary isolated VLAN 160). Packet classifier 400 may also assign packet 440 with a primary VLAN signature associated with primary VLAN 140. Thus, packet 440 may be converted to a modified packet 450 that includes the source MAC address, the destination MAC address, the classified VLAN signature, and the primary VLAN signature. Packet classifier 400 may populate primary VLAN MAC address table 300 with the source MAC address of modified packet 450 and with the classified VLAN signature of modified packet 450, as indicated by reference number 460.

In still another example, community port 330 may receive a packet 470 (e.g., that includes a source MAC address and a destination MAC address), and may provide packet 470 to packet classifier 400. Packet classifier 400 may receive packet 470, and may assign packet 470 with a classified VLAN signature associated with community port's 330 classified VLAN (e.g., secondary community VLAN 150). Packet classifier 400 may also assign packet 470 with a primary VLAN signature associated with primary VLAN 140. Thus, packet 470 may be converted to a modified packet 480 that includes the source MAC address, the destination MAC address, the classified VLAN signature, and the primary VLAN signature. Packet classifier 400 may populate primary VLAN MAC address table 300 with the source MAC address of modified packet 480 and with the classified VLAN signature of modified packet 480, as indicated by reference number 490.

Although FIG. 4 shows example functional components of network device 110-2, in other implementations, network device 110-2 may include fewer functional components, different functional components, differently arranged functional components, or additional functional components than depicted in FIG. 4. Alternatively, or additionally, one or more functional components of network device 110-2 may perform one or more other tasks described as being performed by one or more other functional components of network device 110-2.

Figure 5:
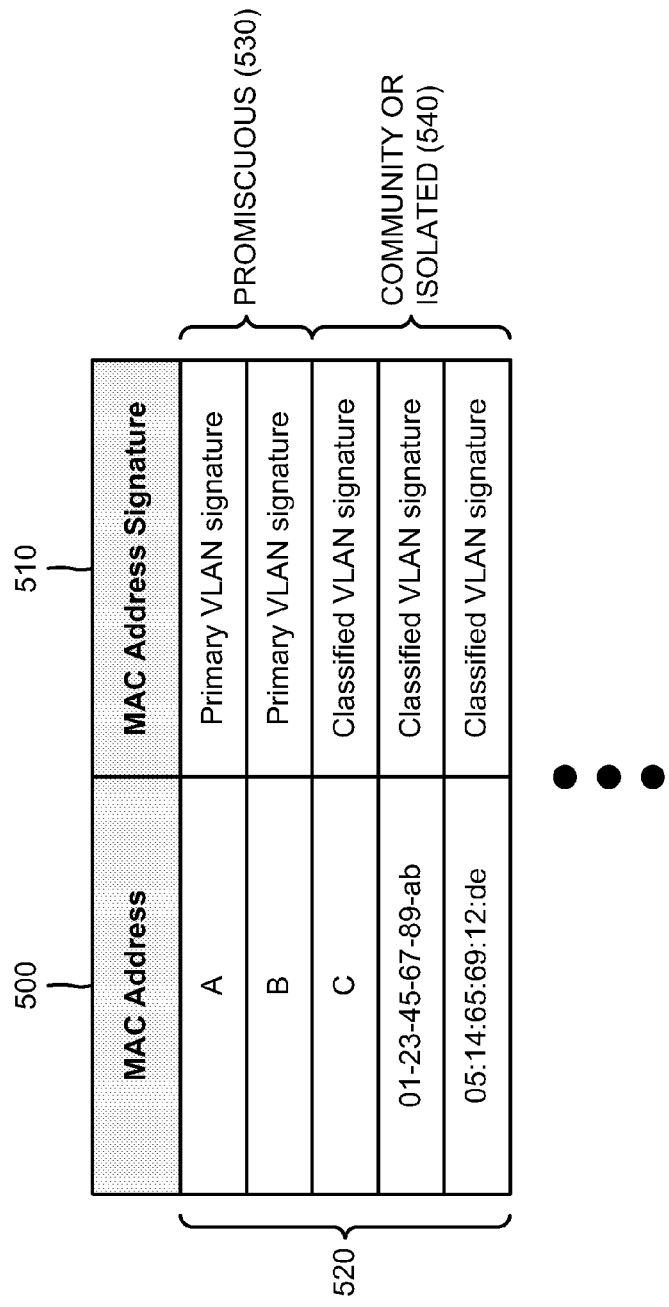
FIG. 5 is a diagram of an example portion of a primary VLAN MAC address table depicted in FIGS. 3 and 4.

FIG. 5 is a diagram of an example portion of primary VLAN MAC address table 300, which may be provided in and/or managed by network device 110-2. As illustrated, primary VLAN MAC address table 300 may include a variety of information associated with MAC addresses learned on all private VLAN ports (e.g., promiscuous port 310, isolated port 320, and/or community ports 330). For example, primary VLAN MAC address table 300 may include a MAC address field 500, a MAC address signature field 510, and/or a variety of entries 520 associated with fields 500 and 510.

MAC address field 500 may include information associated MAC addresses learned on all private VLAN ports (e.g., promiscuous port 310, isolated port 320, and/or community ports 330). For example, with reference to FIG. 4, MAC address field 500 may include the source MAC address of modified packet 420 (e.g., received on promiscuous port 310), the source MAC address of modified packet 450 (e.g., received on isolated port 320), and/or the source MAC address of modified packet 480 (e.g., received on community port 330). As shown in FIG. 5, MAC address field 500 may include numeric, alphanumeric, and/or alphabetical (e.g., "A," "B," "C," etc.) designations for the MAC addresses. In one example implementation, the MAC addresses in MAC address field 500 may include a standard (e.g., IEEE 802) format with six groups of two hexadecimal digits, separated by hyphens (–) or colons (:), in transmission order (e.g., "01-23-45-67-89-ab" or "05:14:65:69:12:de").

MAC address signature field 510 may include signatures associated with the MAC addresses provided in MAC address field 500. The signatures provided in MAC address signature field 510 may be equivalent to the classified VLAN signatures of the packets that provided the MAC addresses of MAC address field 500. For example, with reference to FIG. 4, MAC address signature field 510 may include the classified VLAN signature (e.g., primary VLAN 140) of modified packet 420 (e.g., received on promiscuous port 310); the classified VLAN signature (e.g., secondary isolated VLAN 160) of modified packet 450 (e.g., received on isolated port 320); and/or the classified VLAN signature (e.g., secondary community VLAN 150) of modified packet 480 (e.g., received on community port 330).

As shown in FIG. 5, MAC address signature field 510 may include primary VLAN signatures for MAC addresses "A" and "B" (e.g., of MAC address field 500), as indicated by reference number 530. This may indicate that the packets (e.g., from which MAC addresses "A" and "B" were obtained) were received on promiscuous port 310. MAC address signature field 510 may include classified VLAN signatures for MAC addresses "C," "01-23-45-67-89-ab," and "05:14:65:69:12:de" (e.g., of MAC address field 500), as indicated by reference number 540. This may indicate that the packets (e.g., from which MAC addresses "C," "01-23-45-67-89-ab," and "05:14:65:69:12:de" were obtained) were received on isolated port 320 or one of community ports 330.

Although FIG. 5 shows example information that may be provided in primary VLAN MAC address table 300, in other implementations, primary VLAN MAC address table 300 may contain less information, different information, differently arranged information, and/or additional information than depicted in FIG. 5.

Figure 6:
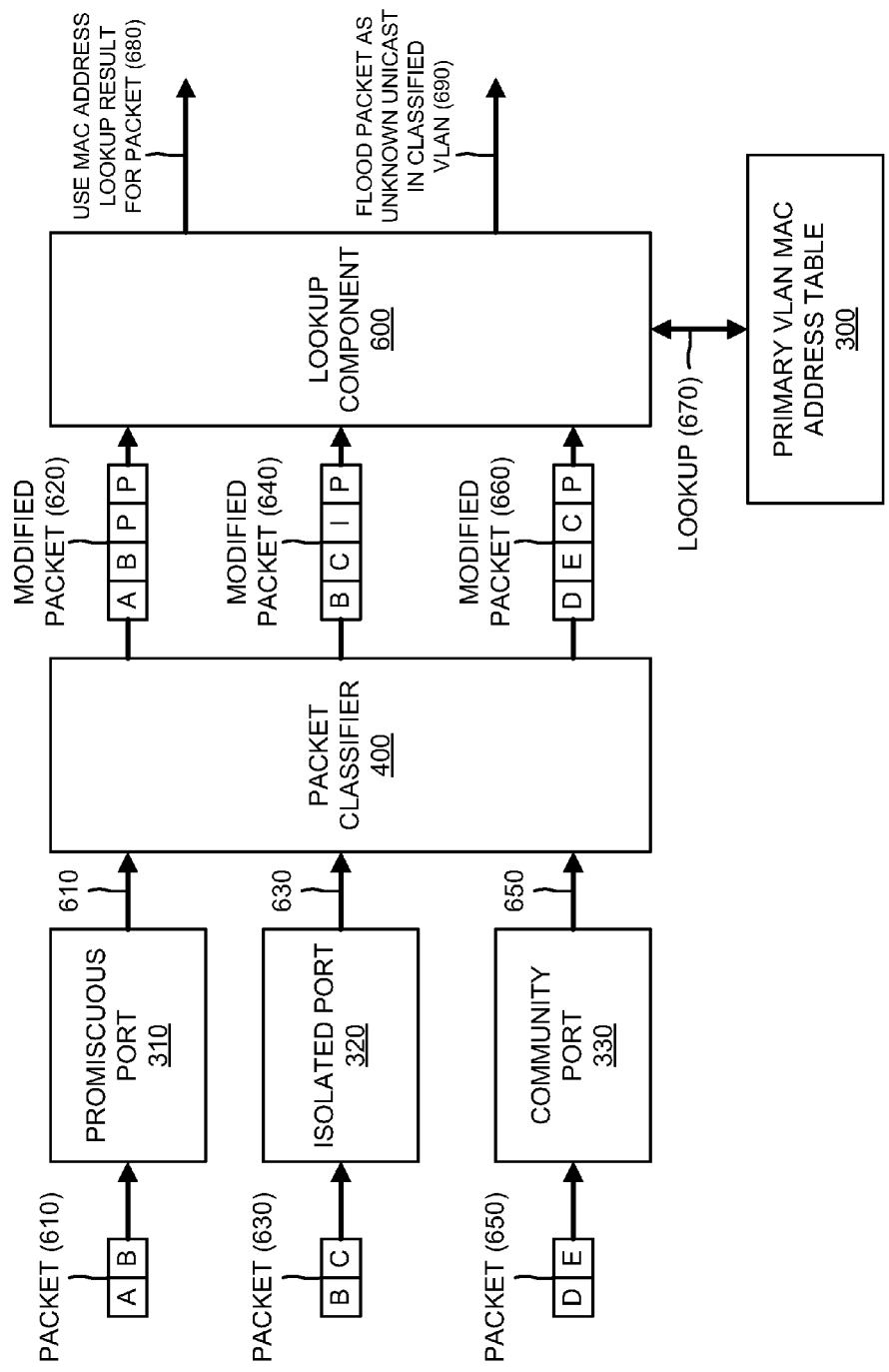
FIG. 6 is a diagram of further example functional components of the network device depicted in FIG. 2.

FIG. 6 is a diagram of further example functional components of network device 110-2. In one implementation, the functions described in connection with FIG. 6 may be performed by one or more components of device 200 (FIG. 2). As illustrated in FIG. 6, network device 110-2 may include primary VLAN MAC address table 300, promiscuous port 310, isolated port 320, community port 330, packet classifier 400, and a lookup component 600. Primary VLAN MAC address table 300, promiscuous port 310, isolated port 320, community port 330, and packet classifier 400 may include the features described above in connection with, for example, FIGS. 3-5.

Lookup component 600 may include hardware or a combination of hardware and software that may receive traffic (e.g., Ethernet unicast traffic) on any private VLAN port (e.g., promiscuous port 310, isolated port 320, and/or community port 330). Lookup component 600 may perform a destination MAC address lookup (e.g., for a packet of the traffic) of primary VLAN MAC address table 300. If lookup component 600 finds an entry (e.g., in MAC address field 500) of primary VLAN MAC address table 300 that matches the destination MAC address of the packet, lookup component 600 may deem the entry qualified (e.g., for forwarding the packet) if the MAC address signature (e.g., provided in MAC address signature field 510) of the entry is the same as the packet's classified VLAN signature. Lookup component 600 may also deem the entry qualified (e.g., for forwarding the packet) if the MAC address signature (e.g., provided in MAC address signature field 510) of the entry is the primary VLAN signature. Lookup component 600 may further deem the entry qualified (e.g., for forwarding the packet) if the classified VLAN signature of the packet is the primary VLAN signature.

If any of the aforementioned conditions are satisfied, lookup component 600 may use the destination MAC address of the located entry (e.g., of primary VLAN MAC address table 300) for forwarding the packet. If none of the aforementioned conditions are satisfied or if lookup component 600 does not locate a matching entry in primary VLAN MAC address table 300, lookup component 600 may treat the packet as unknown unicast traffic, and may flood the packet in the classified VLAN of the packet.

In one example implementation, if broadcast or multicast traffic is received on a private VLAN port (e.g., promiscuous port 310, isolated port 320, or community port 330), lookup component 600 may flood the broadcast or multicast traffic in the classified VLAN of the private VLAN port. In another implementation, the functions of network device 110-2, described above, may be utilized when the private VLAN spans multiple network devices 110, and may be applied to software learning and hardware learning models.

In one example, and as further shown in FIG. 6, promiscuous port 310 may receive a packet 610 (e.g., that includes a source MAC address ("A") and a destination MAC address ("B")), and may provide packet 610 to packet classifier 400. Packet classifier 400 may receive packet 610, and may assign packet 610 with a classified VLAN signature ("P") associated with promiscuous port's 310 classified VLAN (e.g., primary VLAN 140). Packet classifier 400 may also assign packet 610 with a primary VLAN signature ("P") associated with primary VLAN 140. Thus, packet 610 may be converted to a modified packet 620 that includes the source MAC address ("A"), the destination MAC address ("B"), the classified VLAN signature ("P"), and the primary VLAN signature ("P"). Packet classifier 400 may provide modified packet 620 to lookup component 600.

Lookup component 600 may receive modified packet 620, and may perform a destination MAC address lookup (e.g., for modified packet 620) of primary VLAN MAC address table 300, as indicated by reference number 670. If lookup component 600 finds an entry (e.g., in MAC address field 500) of primary VLAN MAC address table 300 that matches the destination MAC address ("B") of modified packet 620, lookup component 600 may deem the entry qualified (e.g., for forwarding modified packet 620) if the MAC address signature (e.g., provided in MAC address signature field 510) of the entry is the same as modified packet's 620 classified VLAN signature ("P"). Lookup component 600 may also deem the entry qualified (e.g., for forwarding modified packet 620) if the MAC address signature (e.g., provided in MAC address signature field 510) of the entry is the primary VLAN signature. Lookup component 600 may further deem the entry qualified (e.g., for forwarding modified packet 620) if the classified VLAN signature ("P") of modified packet 620 is the primary VLAN signature.

If any of the aforementioned conditions are satisfied, lookup component 600 may use the destination MAC address of the located entry (e.g., of primary VLAN MAC address table 300) for forwarding modified packet 620, as indicated by reference number 680. If none of the aforementioned conditions are satisfied or if lookup component 600 does not locate a matching entry in primary VLAN MAC address table 300, lookup component 600 may treat modified packet 620 as unknown unicast traffic, and may flood modified packet 620 in the classified VLAN (e.g., primary VLAN 140) of modified packet 620, as indicated by reference number 690. In the example provided, since the classified VLAN signature ("P") of modified packet 620 is the primary VLAN signature, modified packet 620 may be forwarded in accordance with reference number 680.

In another example, and as further shown in FIG. 6, isolated port 320 may receive a packet 630 (e.g., that includes a source MAC address ("B") and a destination MAC address ("C")), and may provide packet 630 to packet classifier 400. Packet classifier 400 may receive packet 630, and may assign packet 630 with a classified VLAN signature ("I") associated with isolated port's 320 classified VLAN (e.g., secondary isolated VLAN 160). Packet classifier 400 may also assign packet 630 with a primary VLAN signature ("P") associated with primary VLAN 140. Thus, packet 630 may be converted to a modified packet 640 that includes the source MAC address ("B"), the destination MAC address ("C"), the classified VLAN signature ("I"), and the primary VLAN signature ("P"). Packet classifier 400 may provide modified packet 640 to lookup component 600.

Lookup component 600 may receive modified packet 640, and may perform a destination MAC address lookup (e.g., for modified packet 640) of primary VLAN MAC address table 300, as indicated by reference number 670. If lookup component 600 finds an entry (e.g., in MAC address field 500) of primary VLAN MAC address table 300 that matches the destination MAC address ("C") of modified packet 640, lookup component 600 may deem the entry qualified (e.g., for forwarding modified packet 640) if the MAC address signature (e.g., provided in MAC address signature field 510) of the entry is the same as modified packet's 640 classified VLAN signature ("I"). Lookup component 600 may also deem the entry qualified (e.g., for forwarding modified packet 640) if the MAC address signature (e.g., provided in MAC address signature field 510) of the entry is the primary VLAN signature. Lookup component 600 may further deem the entry qualified (e.g., for forwarding modified packet 640) if the classified VLAN signature ("I") of modified packet 640 is the primary VLAN signature.

If any of the aforementioned conditions are satisfied, lookup component 600 may use the destination MAC address of the located entry (e.g., of primary VLAN MAC address table 300) for forwarding modified packet 640, as indicated by reference number 680. If none of the aforementioned conditions are satisfied or if lookup component 600 does not locate a matching entry in primary VLAN MAC address table 300, lookup component 600 may treat modified packet 640 as unknown unicast traffic, and may flood modified packet 640 in the classified VLAN (e.g., secondary isolated VLAN 160) of modified packet 640, as indicated by reference number 690. In the example provided, since the classified VLAN signature ("I") of modified packet 640 is the same as the MAC address signature of entry "C" (e.g., of primary VLAN MAC address table 300), modified packet 640 may be forwarded in accordance with reference number 680.

In still another example, and as further shown in FIG. 6, community port 330 may receive a packet 650 (e.g., that includes a source MAC address ("D") and a destination MAC address ("E")), and may provide packet 650 to packet classifier 400. Packet classifier 400 may receive packet 650, and may assign packet 650 with a classified VLAN signature ("C") associated with community port's 330 classified VLAN (e.g., secondary community VLAN 150). Packet classifier 400 may also assign packet 650 with a primary VLAN signature ("P") associated with primary VLAN 140. Thus, packet 650 may be converted to a modified packet 660 that includes the source MAC address ("D"), the destination MAC address ("E"), the classified VLAN signature ("C"), and the primary VLAN signature ("P"). Packet classifier 400 may provide modified packet 660 to lookup component 600.

Lookup component 600 may receive modified packet 660, and may perform a destination MAC address lookup (e.g., for modified packet 660) of primary VLAN MAC address table 300, as indicated by reference number 670. If lookup component 600 finds an entry (e.g., in MAC address field 500) of primary VLAN MAC address table 300 that matches the destination MAC address ("E") of modified packet 660, lookup component 600 may deem the entry qualified (e.g., for forwarding modified packet 660) if the MAC address signature (e.g., provided in MAC address signature field 510) of the entry is the same as modified packet's 660 classified VLAN signature ("C"). Lookup component 600 may also deem the entry qualified (e.g., for forwarding modified packet 660) if the MAC address signature (e.g., provided in MAC address signature field 510) of the entry is the primary VLAN signature. Lookup component 600 may further deem the entry qualified (e.g., for forwarding modified packet 660) if the classified VLAN signature ("C") of modified packet 660 is the primary VLAN signature.

If any of the aforementioned conditions are satisfied, lookup component 600 may use the destination MAC address of the located entry (e.g., of primary VLAN MAC address table 300) for forwarding modified packet 660, as indicated by reference number 680. If none of the aforementioned conditions are satisfied or if lookup component 600 does not locate a matching entry in primary VLAN MAC address table 300, lookup component 600 may treat modified packet 660 as unknown unicast traffic, and may flood modified packet 660 in the classified VLAN (e.g., secondary community VLAN 150) of modified packet 660, as indicated by reference number 690. In the example provided, since the destination MAC address ("E") of modified packet 660 is not provided in primary VLAN MAC address table 300, modified packet 660 may be forwarded in accordance with reference number 690.

Although FIG. 6 shows example functional components of network device 110-2, in other implementations, network device 110-2 may include fewer functional components, different functional components, differently arranged functional components, or additional functional components than depicted in FIG. 6. Alternatively, or additionally, one or more functional components of network device 110-2 may perform one or more other tasks described as being performed by one or more other functional components of network device 110-2.

Figure 7:
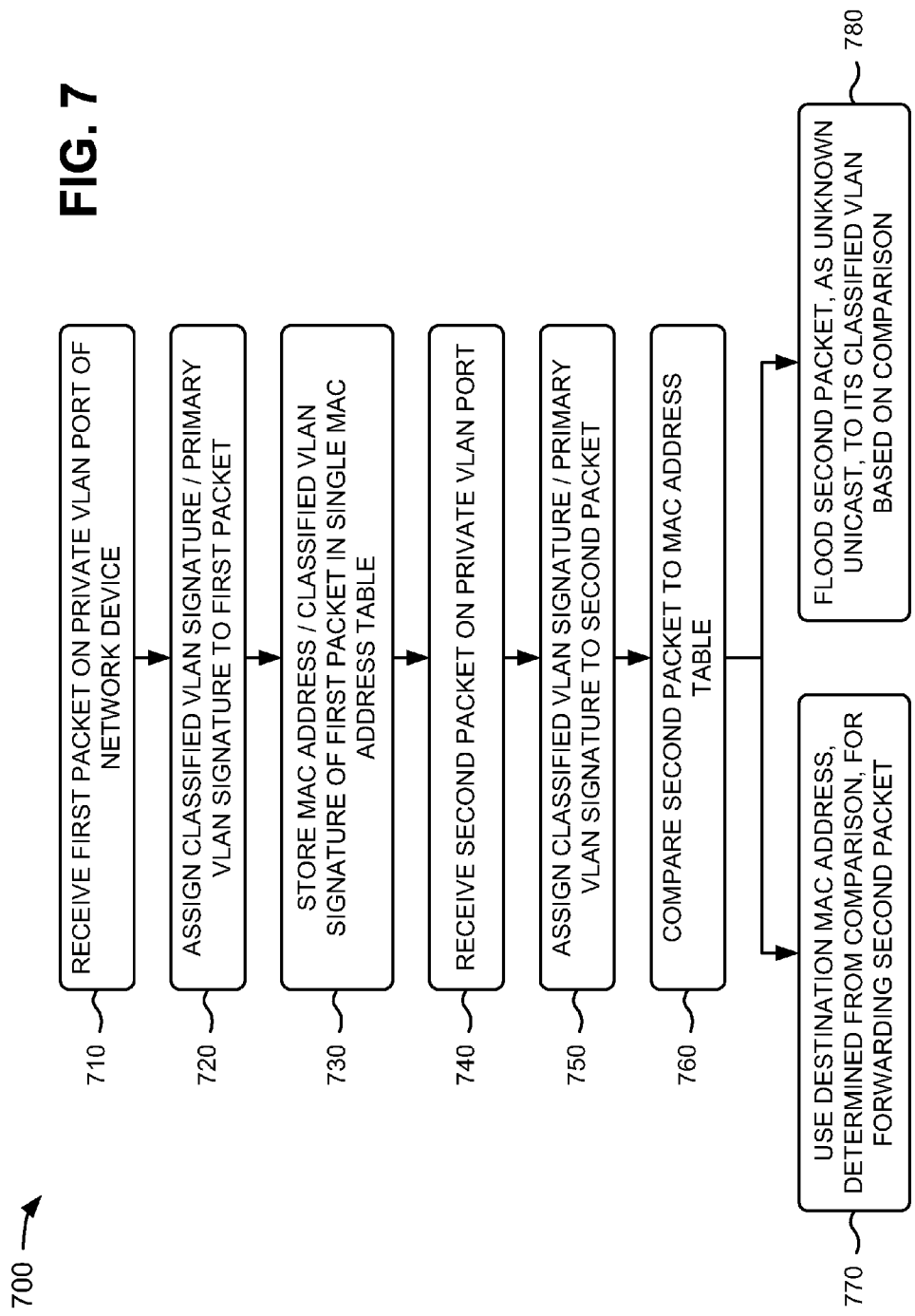

FIGS. 7 and 8 are flow charts of an example process 700 for optimizing private VLANs according to implementations described herein. In one implementation, process 700 may be performed by network device 110-2. In another implementation, some or all of process 700 may be performed by another device in conjunction with network device 110-2.

As illustrated in FIG. 7, process 700 may include receiving a first packet on a private VLAN port of a network device (block 710), and assigning a classified VLAN signature and a primary VLAN signature to the first packet (block 720). For example, in implementations described above in connection with FIG. 4, packet classifier 400 of network device 110-2 may receive a packet (e.g., from one of promiscuous port 310, isolated port 320, or community port 330). Packet classifier 400 may assign the packet with a classified VLAN signature associated with the port's classified VLAN, and may assign the packet with a primary VLAN signature associated with primary VLAN 140. For example, if the packet is received on isolated port 320, the port's classified VLAN would be secondary isolated VLAN 160, and packet classifier 400 may assign the packet with a classified VLAN signature associated with secondary isolated VLAN 160.

As further shown in FIG. 7, process 700 may include storing a MAC address and the classified VLAN signature of the first packet in a single MAC address table (block 730). For example, in implementations described above in connection with FIG. 4, for MAC addresses (e.g., provided in packets received by network device 110-2) learned on promiscuous port 310, isolated port 320, or community port 330, packet classifier 400 may populate primary VLAN MAC address table 300 with the MAC addresses and with signatures equal to the packets' classified VLAN signatures.

Returning to FIG. 7, process 700 may include receiving a second packet on a private VLAN port (block 740), and assigning a classified VLAN signature and a primary VLAN signature to the second packet (block 750). For example, in implementations described above in connection with FIG. 6, promiscuous port 310 may receive packet 610 (e.g., that includes a source MAC address ("A") and a destination MAC address ("B")), and may provide packet 610 to packet classifier 400. Packet classifier 400 may receive packet 610, and may assign packet 610 with a classified VLAN signature ("P") associated with promiscuous port's 310 classified VLAN (e.g., primary VLAN 140). Packet classifier 400 may also assign packet 610 with a primary VLAN signature ("P") associated with primary VLAN 140.

As further shown in FIG. 7, process 700 may include comparing the second packet to the MAC address table (block 760), and one of using a destination MAC address, determined from the comparison, for forwarding the second packet (block 770) or flooding the second packet, as unknown unicast traffic, to the second packet's classified VLAN based on the comparison (block 780). For example, in implementations described above in connection with FIG. 6, lookup component 600 of network device 110-2 may perform a destination MAC address lookup (e.g., for a packet of the traffic) of primary VLAN MAC address table 300. Based on the destination MAC address lookup, lookup component 600 may use the destination MAC address of the located entry (e.g., of primary VLAN MAC address table 300) for forwarding the packet. Alternatively, based on the destination MAC address lookup (e.g., if lookup component 600 does not locate a matching entry in primary VLAN MAC address table 300), lookup component 600 may treat the packet as unknown unicast traffic, and may flood the packet in the classified VLAN of the packet.

Process block 760 may include the process blocks depicted in FIG. 8. As shown in FIG. 8, process block 760 may include determining if a MAC address of the second packet matches a MAC address entry in the MAC address table (block 800). If the MAC address of the second packet does not match a MAC address entry in the MAC address table (block 800—NO), process block 760 may proceed to process block 780 (FIG. 7). For example, in implementations described above in connection with FIG. 6, lookup component 600 may perform a destination MAC address lookup (e.g., for a packet of the traffic) of primary VLAN MAC address table 300 to find an entry (e.g., in MAC address field 500) of primary VLAN MAC address table 300 that matches the destination MAC address of the packet. If lookup component 600 does not locate a matching entry in primary VLAN MAC address table 300, lookup component 600 may treat the packet as unknown unicast traffic, and may flood the packet in the classified VLAN of the packet.

As further shown in FIG. 8, if the MAC address of the second packet matches a MAC address entry in the MAC address table (block 800—YES), process block 760 may include determining if the MAC address entry's signature matches a classified VLAN signature of the second packet (block 810). If the MAC address entry's signature matches the classified VLAN signature of the second packet (block 810—YES), process block 760 may proceed to process block 770 (FIG. 7). For example, in implementations described above in connection with FIG. 6, if lookup component 600 finds an entry (e.g., in MAC address field 500) of primary VLAN MAC address table 300 that matches the destination MAC address of the packet, lookup component 600 may deem the entry qualified (e.g., for forwarding the packet) if the MAC address signature (e.g., provided in MAC address signature field 510) of the entry is the same as the packet's classified VLAN signature.

Returning to FIG. 8, if the MAC address entry's signature does not match the classified VLAN signature of the second packet (block 810—YES), process block 760 may include determining if the MAC address entry's signature is a primary VLAN signature (block 820). If the MAC address entry's signature is a primary VLAN signature (block 820—YES), process block 760 may proceed to process block 770 (FIG. 7). For example, in implementations described above in connection with FIG. 6, lookup component 600 may also deem the entry qualified (e.g., for forwarding the packet) if the MAC address signature (e.g., provided in MAC address signature field 510) of the entry is the primary VLAN signature.

As further shown in FIG. 8, if the MAC address entry's signature is not a primary VLAN signature (block 820—NO), process block 760 may include determining if the classified VLAN signature of the second packet is a primary VLAN signature (block 830). If the classified VLAN signature of the second packet is a primary VLAN signature (block 830—YES), process block 760 may proceed to process block 770 (FIG. 7). Otherwise (block 830—NO), process block 760 may proceed to process block 780 (FIG. 8). Lookup component 600 may further deem the entry qualified (e.g., for forwarding the packet) if the classified VLAN signature of the packet is the primary VLAN signature. If the classified VLAN signature of the packet is not the primary VLAN signature, lookup component 600 may treat the packet as unknown unicast traffic, and may flood the packet in the classified VLAN of the packet.

Systems and/or methods described herein may implement private VLANs with hardware learning and without CPU intervention. For example, the systems and/or methods may classify packets received by private VLAN ports based on the types of ports (e.g., promiscuous, community, or isolated) receiving the packets. The systems and/or methods may also apply MAC address learning to all private VLAN ports, and may store the learned MAC addresses in a single primary VLAN MAC address table (e.g., rather than in multiple tables). The systems and/or methods may also utilize a destination MAC lookup (e.g., of the primary VLAN MAC address table) to determine whether to forward a packet to a located MAC address or to treat the packet as unknown unicast traffic.

The systems and/or methods may significantly improve MAC address learning performance for private VLANs by populating MAC address entries in a single MAC address table. Thus, the systems and/or methods conserve hardware resources by eliminating the need to maintain multiple MAC address tables.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a network device in a private virtual local area network (VLAN), a first packet on a particular port of a plurality of private VLAN ports of the network device;
   assigning, by the network device, a classified VLAN signature to the first packet,
      the classified VLAN signature assigned to the first packet including information identifying a classified VLAN associated with the particular port;
   assigning, by the network device, a primary VLAN signature to the first packet,
      the primary VLAN signature assigned to the first packet including information identifying a primary VLAN of the private VLAN, and
      the classified VLAN being the primary VLAN or a secondary VLAN;
   storing, by the network device and in a single media access control (MAC) address table, a MAC address of the first packet and the classified VLAN signature assigned to the first packet;
   receiving, by the network device, a second packet;
   determining, by the network device, whether a MAC address of the second packet matches a MAC address entry in the MAC address table; and
   flooding, by the network device, the second packet when the MAC address of the second packet does not match the MAC address entry in the MAC address table.

2. The method of claim 1, where the MAC address of the first packet includes a destination MAC address of the first packet.

3. The method of claim 1, further comprising:
   assigning a classified VLAN signature to the second packet; and
   assigning a primary VLAN signature to the second packet.

4. The method of claim 1, further comprising:
   receiving a third packet;
   determining a destination MAC address based on comparing information from the third packet to the MAC address table; and
   forwarding, based on the destination MAC address, the third packet toward a destination.

5. The method of claim 1, further comprising:
   receiving a third packet;
   determining whether a MAC address of the third packet matches another MAC address entry in the MAC address table;
   determining, when the MAC address of the third packet matches the other MAC address entry in the MAC address table, whether a signature of the other MAC address entry matches a classified VLAN signature assigned to the third packet; and
   forwarding, based on the other MAC address entry, the third packet toward a destination when the signature of the other MAC address entry matches the classified VLAN signature assigned to the third packet.

6. The method of claim 5, further comprising:
   determining, when the signature of the other MAC address entry does not match the classified VLAN signature of the third packet, whether the signature of the other MAC address entry is a primary VLAN signature assigned to the third packet; and
   forwarding, based on the other MAC address entry, the third packet toward a destination when the signature of the other MAC address entry is the primary VLAN signature assigned to the third packet.

7. The method of claim 6, further comprising:
   determining, when the signature of the other MAC address entry is not the primary VLAN signature assigned to the third packet, whether the classified VLAN signature assigned to the third packet is the primary VLAN signature assigned to the third packet; and
   forwarding, based on the other MAC address entry, the third packet toward a destination when the classified VLAN signature assigned to the third packet is the primary VLAN signature assigned to the third packet.

8. The method of claim 7, further comprising:
   flooding the third packet, as unknown unicast traffic, to a classified VLAN assigned to the third packet when the classified VLAN signature of the third packet is not the primary VLAN signature assigned to the third packet.

9. A network device provided in a private virtual local area network (VLAN), the network device comprising:
   a memory to store a plurality of instructions; and
   a processor to execute the plurality of instructions in the memory to:
      receive a first packet on a particular port of a plurality of private VLAN ports of the network device,
      assign a classified VLAN signature to the first packet,
         the classified VLAN signature assigned to the first packet including information identifying a classified VLAN associated with the particular port,
      assign a primary VLAN signature to the first packet,
         the primary VLAN signature assigned to the first packet including information identifying a primary VLAN of the private VLAN, and
         the classified VLAN being the primary VLAN or a secondary VLAN,
      store, in a single media access control (MAC) address table, a MAC address of the first packet and the classified VLAN signature assigned to the first packet,
         the MAC address of the first packet including a destination MAC address of the first packet,
      receive a second packet,
      determine whether a signature of a MAC address entry, in the MAC address table, matches a classified VLAN signature assigned to the second packet, and
      forward, based on the MAC address entry, the second packet toward a destination when the signature of the MAC address entry matches the classified VLAN signature assigned to the second packet.

10. The network device of claim 9, where the processor is further to execute the plurality of instructions in the memory to:
   receive a third packet on another port of the plurality of private VLAN ports,
   assign a classified VLAN signature to the third packet,
   assign a primary VLAN signature to the third packet, and
   compare information from the third packet to the MAC address table.

11. The network device of claim 10, where the processor is further to execute the plurality of instructions in the memory to:
   determine a destination MAC address based on comparing the third packet to the MAC address table, and
   forward, based on the destination MAC address, the second packet toward a destination.

12. The network device of claim 10, where, when comparing the information from the third packet to the MAC address table, the processor is to execute the plurality of instructions in the memory to:
   determine whether a MAC address of the third packet matches another MAC address entry in the MAC address table, and
   flood the third packet, as unknown unicast traffic, to a classified VLAN associated with the third packet when the MAC address of the third packet does not match the other MAC address entry in the MAC address table.

13. The network device of claim 9, where, when determining whether the signature of the MAC address entry matches the classified VLAN signature assigned to the second packet, the processor is further to execute the plurality of instructions in the memory to:
   determine that a MAC address of the second packet matches the MAC address entry in the MAC address table,
   determine, after determining that the MAC address of the second packet matches the MAC address entry in the MAC address table, whether the signature of the MAC address entry matches the classified VLAN signature assigned to the second packet.

14. The network device of claim 9, where the processor is further to execute the plurality of instructions in the memory to:
   determine, when the signature of the MAC address entry does not match the classified VLAN signature of the second packet, whether the signature of the MAC address entry is the primary VLAN signature assigned to the second packet, and
   forward, based on the MAC address entry, the second packet toward the destination, when the signature of the MAC address entry is a primary VLAN signature assigned to the second packet.

15. The network device of claim 14, where the processor is further to execute the plurality of instructions in the memory to:
   determine, when the signature of the MAC address entry is not the primary VLAN signature of the second packet, whether the classified VLAN signature of the second packet is the primary VLAN signature assigned to the second packet, and
   forward, based on the MAC address entry, the second packet toward the destination when the classified VLAN signature of the second packet is the primary VLAN signature assigned to the second packet.

16. The network device of claim 15, where the processor is further to execute instructions in the memory to:
   flood the second packet, as unknown unicast traffic, to a classified VLAN when the classified VLAN signature of the second packet is not the primary VLAN signature assigned to the second packet.

17. The network device of claim 16,
   where the private VLAN comprises the primary VLAN,
   where the primary VLAN comprises the secondary VLAN, and
   where the secondary VLAN comprises a community VLAN and an isolated VLAN.

18. A non-transitory computer-readable media storing instructions, the instructions comprising:
   one or more instructions that, when executed by at least one processor of a network device, cause the at least one processor to:
      receive a first packet on a particular port of a plurality of private virtual local area network (VLAN) ports of the network device;
      assign a classified VLAN signature to the first packet,
         the classified VLAN signature assigned to the first packet including information identifying a classified VLAN associated with the particular port;
      assign a primary VLAN signature to the first packet,
         the primary VLAN signature assigned to the first packet including information identifying a primary VLAN associated with the network device, and
         the classified VLAN being the primary VLAN or a secondary VLAN;
      store, in a single media access control (MAC) address table, a MAC address of the first packet and the classified VLAN signature assigned to the first packet;
      receive a second packet;
      determine whether a MAC address of the second packet matches a MAC address entry in the MAC address table; and forward the second packet to a classified VLAN when the MAC address of the second packet does not match the MAC address entry in the MAC address table.

19. The non-transitory computer-readable media of claim 18, where the instructions further comprise:
one or more instructions that, when executed by the at least one processor, cause the at least one processor to:
assign a classified VLAN signature to the second packet; and
assign a primary VLAN signature to the second packet.

20. The non-transitory computer-readable media of claim 18, where the instructions further comprise:
one or more instructions that, when executed by the at least one processor, cause the at least one processor to:
determine, when the MAC address of the second packet matches the MAC address entry in the MAC address table, whether a signature of the MAC address entry matches a classified VLAN signature assigned to the second packet, and
forward, based on the MAC address entry, the second packet toward a destination when the signature of the MAC address entry matches the classified VLAN signature assigned to the second packet.

* * * * *